Oct. 15, 1935.  W. H. PRATT  2,017,703
INTEGRATING METER
Filed Sept. 15, 1934
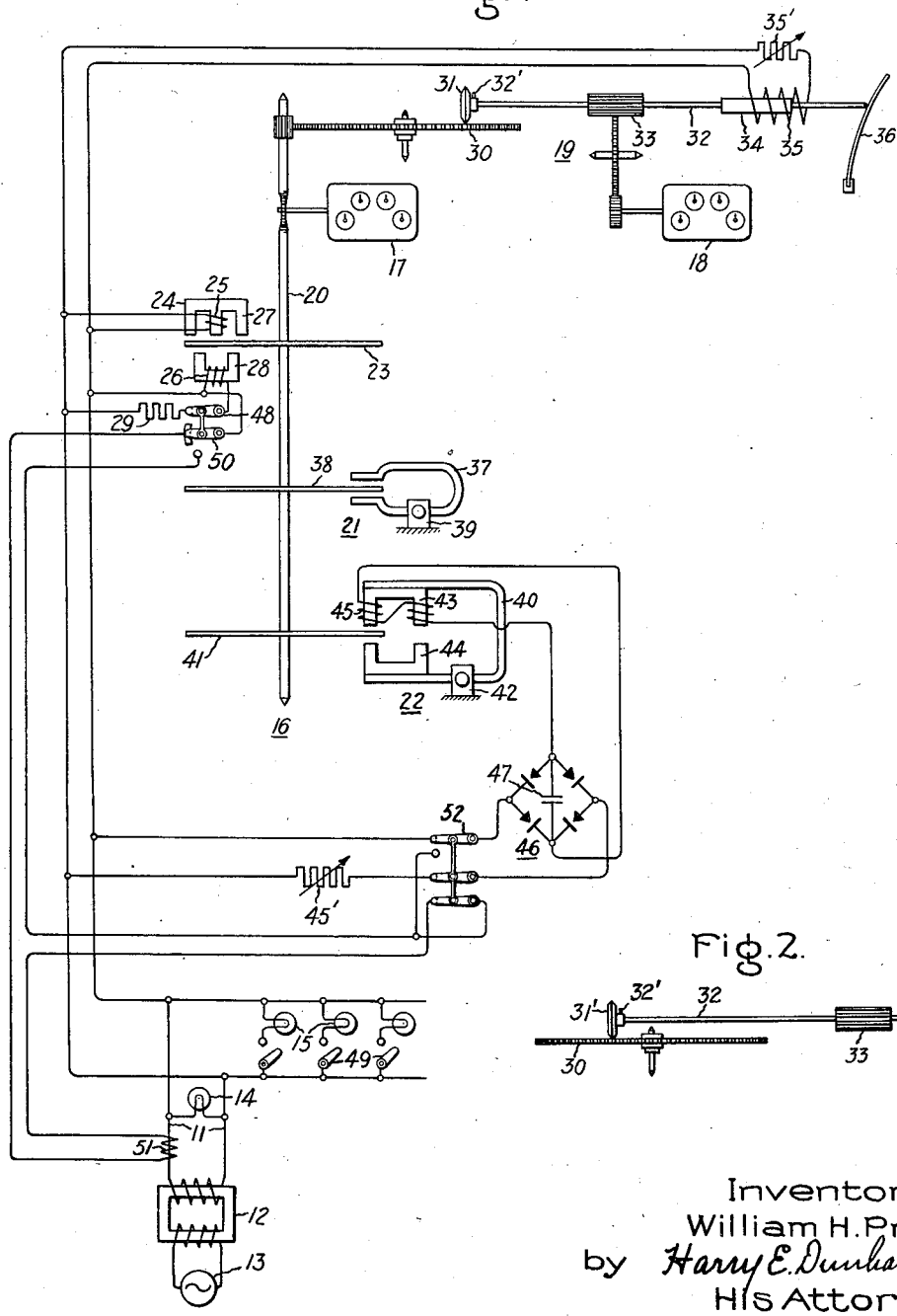
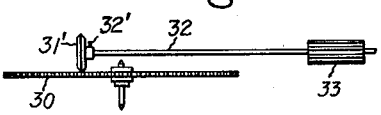
Inventor:
William H. Pratt,
by Harry E. Dunham
His Attorney.

Patented Oct. 15, 1935

2,017,703

UNITED STATES PATENT OFFICE 2,017,703

INTEGRATING METER

William H. Pratt, Lynn, Mass., assignor to General Electric Company, a corporation of New York Application September 15, 1934, Serial No. 744,181

20 Claims. (Cl. 171—34)

My invention relates to electrical measuring devices and concerns particularly integrating meters for registering the time integrals of powers of variable quantities.

It has been found that certain quantities in electrical circuits vary approximately as the fourth power of voltage. For example, the reactive volt-ampere input or reactive component of volt-ampere input of a transformer is found to be proportional to a power of voltage at the output terminals varying between the 3.5 and the 4.1 power, depending upon the design of the transformer. This fact permits measuring the reactive power even in cases where all the metering must be done on the secondary side of a transformer. The light output from incandescent electric lamps is also found to vary approximately as the fourth power of voltage or, in some types, more nearly as the third power.

One of the objects of my invention is the provision of an electric meter calibrated to read in voltage-to-the-fourth power times hours.

Another object is the provision of a meter for integrating the reactive volt-ampere input of a transformer, for integrating the light output of an electric lamp, or for integrating other quantities, the magnitude of which varies as the fourth power of voltage or a power of voltage close to the fourth power.

It is also an object of my invention to provide a meter for integrating a quantity varying as a function of both current and a power of voltage such as the light produced by a lighting system having a plurality of lamps in which the lamps are not necessarily turned on and off simultaneously.

It is still another object of my invention to produce a meter which may be adjusted to integrate any power of voltage within certain limits whether positive or negative, including both integral and fractional powers. It is likewise an object to provide an arrangement for integrating the product of such a power of voltage and some function of current or the power component of current, including the case where one of the quantities is raised to the power zero. Furthermore, it is an object of my invention to provide an arrangement for integrating functions of one or more variable quantities of any type which may be represented by variable voltages or currents.

Other and further objects and advantages will become apparent as the description proceeds.

In accordance with my invention in its preferred form, I provide an integrating meter of the induction disc watt-hour meter type with cooperating potential windings to produce a torque proportional to the square of voltage and with means for causing the speed of the register to increase more rapidly than the torque acting on the induction disc. A variable ratio transmission may be introduced between the rotatable disc and the register or braking mechanism may be applied to the rotatable disc which varies in effect as the voltage and torque increase.

The features of my invention which I believe to be novel and patentable will be pointed out in the claims appended hereto. A better understanding of my invention may be obtained by referring to the following description taken in connection with the accompanying drawing schematically illustrating an embodiment of my invention in Fig. 1 and partially illustrating a modification in Fig. 2.

In the drawing, an electrical distribution circuit is represented at 11, energized through a transformer 12 from a high tension alternating current transmission system represented at 13. A load on the distribution system 11 is represented by the bank of incandescent lamps 14 and 15. In order to integrate the desired power of voltage with respect to time, an integrating meter is provided which may comprise an induction motor unit 16 of any desired type such as the induction disc type, a pair of registers 17 and 18, either of which may be used depending upon which function of voltage is to be integrated, a voltage-responsive variable-speed ratio transmission 19 interposed between the shaft 20 of the induction disc motor 16 and the register 18, and a pair of removable damping or brake mechanisms 21 and 22, either or both of which may be used depending upon the function to be integrated, the latter brake mechanism 22 varying in effect in response to variations in voltage.

The motor unit 16 is provided with an induction disc 23 mounted on the shaft 20 to form a rotatable member and a stator or field member 24 arranged to provide a shifting or rotating magnetic field. Any suitable field construction for producing the shifting field may be employed such as the shaded-pole or split-phase arrangements commonly used in relays and meters of the induction disc type. For the sake of illustration, I have shown in the drawing an embodiment employing two voltage windings 25 and 26 in time and space quadrature on a field core of the type employed in standard watt-hour meters having an E-shaped portion 27 and a U-shaped portion 28, but it will be understood that my invention is not limited to the precise construction illustrated. The winding 26, serving as the split-phase winding, is connected in series with a resistor 29 in order to introduce a phase displacement between the current flowing in winding 26 and the highly inductive winding 25, thereby producing a shifting magnetic flux acting on the inductive disc 23. As in any induction motor, the torque produced varies substantially as the square of the applied voltage of the circuit 11 to which windings 25 and 26 are connected.

The variable speed ratio transmission 19 may consist, for example, of a driving disc 30 engaging a friction disc 31 mounted on a longitudinally movable shaft 32 carrying an elongated pinion 33 and a magnetic plunger 34, a solenoid 35 connected across the circuit 11, and a spring 36 opposing the attractive force of solenoid 35 on plunger 34. Through the pinion 33, the shaft 32 is geared to the register 18.

The brake mechanism 21 comprises a removable permanent magnet 57 mountable with its pole portions on opposite sides of an induction disc 38 carried by the shaft 20, or, if desired, the parts may be so mounted as to permit a single disc 23 to cooperate with both the motor field structure 24 and the brake magnet 37. A clamp 39 is provided to permit easily mounting or removing the magnet 37.

The brake mechanism 22 also comprises a removable permanent magnet 40 cooperating with an induction disc, which may be a separate disc 41, or a disc, such as disc 23, common to one or more other units of the apparatus. A clamp 42 is provided to permit removably mounting the magnet 40 also. In order to provide a voltage-responsive means for varying the braking effect of the mechanism 22, the magnet 40 is provided with pole pieces 43 and 44 of soft iron or other permeable magnetic material, one or both of which carries electrical windings such as the windings 45 which are energized from the alternating current distribution circuit 11. The windings 45 may be arranged to modify the flux produced by magnet 40 either by saturating a portion of the magnetic path and increasing its reluctance or by introducing an addditional magnetomotive force acting in conjunction with the magnetomotive force of the magnet 40. If desired, the winding 45 may be supplied with direct current by interposing between the alternating current circuit 11 and the winding 45 a full wave rectifier 46 consisting of copper oxide rectifiers in the well known bridge connection and having a condenser 47 to smooth out the voltage wave.

When it is desired to integrate the amount of light given off by the lamp 14 or the reactive power input of the transformer 12 or to integrate any other quantity varying substantially as the fourth power of the voltage between the conductors 11, the apparatus may be set in either of two ways. In accordance with one way of setting the apparatus, the brake mechanism 22 is taken out of service by loosening the clamp 42 and removing the magnet 40. In this case, the readings of register 17 are disregarded and readings are taken only on the register 18. The permanent magnet brake mechanism 21 is secured in place to make the braking effect dependent only upon the speed of the shaft 20. The switch blade 48 is left in the upward position so that the winding 26 as well as the winding 25 is connected across the conductors 11 and the torque and speed of the induction motor mechanism 16 varies as the square of the voltage of the circuit 11. The elements of the variable speed ratio transmission 19 are so proportioned and positioned as will readily be understood by those skilled in the art that the radial distance between the axis of the driving disc 30 and the point of contact of the friction disc 31 with the driving disc 30 varies substantially as the square of the voltage of the circuit 11 to which winding 35 is also connected. Owing to the fact that the range of variation of the voltage in commercial circuits is very small, this adjustment can readily be made.

Since the speed of the shaft 20 and the transmission ratio between gear 30 and shaft 32 both vary as the square of the voltage, the speed of the register 18 will vary as the product of the two variations or as the fourth power of the voltage of the circuit 11. In case the quantity to be integrated varies more or less rapidly than the fourth-power of voltage, a suitable change in proportioning and positioning of the elements of the variable speed ratio transmission 19 is made, as will be readily understood, to cause the relationship between speed of the register 18 and voltage of circuit 11 to conform to the desired relationship. The degree of variation in speed ratio may be adjusted for example by loosening the set screw 32' and sliding the friction disc one way or the other on the shaft 32, or by varying the strength of the solenoid 35 by means of the rheostat 35'. Various other adjustments, such as a movable mounting for the spring 36, will suggest themselves to those skilled in the art for the purpose of facilitating the adaptation of the apparatus to different kinds of measurement.

In accordance with another way of setting the apparatus, the register 17 is read instead of the register 18, and the brake mechanism 22 is put in service instead of brake mechanism 21 by removing the magnet 37 and mounting the magnet 40 in the clamp 42, as shown. Where the quantity to be integrated varies as the fourth power of voltage, the windings 45 of brake mechanism 22 are connected to oppose the magnetism of the magnet 40 and the parts are so proportioned that the flux acting on the disc 41 varies inversely as the voltage of circuit 11 and, at a given speed of the disc 41, the resisting torque of the braking mechanism 22 correspondingly varies inversely as the square of the voltage.

As previously explained, the voltage of the circuit 11 varies within rather narrow limits and the proper adjustment of the brake mechanism within the required range is easily obtained. Where the quantity to be integrated varies more or less rapidly than the fourth power of voltage, the brake mechanism is adjusted accordingly by adjusting the strength of the windings 45 or the proportioning of the magnetic circuit.

The variable strength brake mechanism 22 may also be provided with various adjustments, such as the rheostat 45', the slidable mounting 42 for the magnet 40, and other adjustments will suggest themselves to those skilled in the art for the purpose of varying the relative effects of magnet 40 and winding 45, adjusting the relationship between voltage and braking effect without rebuilding the apparatus.

Either the variable ratio transmission or the variable strength brake mechanism alone readily permits obtaining any integral or fractional exponential relationship between voltage and the speed of the register up to and beyond the fifth power of voltage. In using the term "power" in the description and claims, I mean to include not only the value of the quantity with an integral exponent but also cases where the exponent is a proper or improper fraction or is negative. However, if desired, both the variable ratio transmission 19 and the variable strength brake mechanism 22 may be used simultaneously by clamping magnet 40 in place and taking readings on the register 18, thereby obtaining even greater variations in speed of the register with variations in voltage.

Thus far, I have referred more particularly to application of my invention to the integration of quantities varying as a power of voltage higher than the second. However, the invention is equally applicable to applications where the quantity to be integrated varies as a power of voltage less than the second, including negative powers, being practicable even beyond the minus third power, i. e., cases where the quantity to be integrated varies inversely as the third or higher power of voltage. This is accomplished by reversing the connections of the windings 45 in the case where the brake mechanism 22 is employed so that the magnetomotive force of windings 45 acts cumulatively with the magnet 40 and the braking effect at any given speed increases with the voltage, causing the speed of the register 17 to increase less rapidly with voltage than the torque produced by the motor unit 16.

In the cases where the variable speed ratio transmission 19 is employed instead of the variable strength brake mechanism 22, a quantity varying as a power of voltage less than the square may be integral by lengthening the shaft 32 of the transmission 19 and mounting a friction disc 31' on the shaft 32 beyond the axis of the gear 30 in the position shown in Fig. 2. Increase of the voltage acting on the winding 35 will then decrease the distance from the axis of gear 30 to the friction disc 31' and cause the ratio of the speed of register 18 to the speed of shaft 20 to increase less rapidly than voltage.

Although for convenience I have referred in the foregoing to all the windings of the apparatus as being voltage windings and being connected across the circuit 11, it will be understood that my invention is not limited to this precise arrangement but obviously includes connections of some or all the windings in series with the circuit 11 as current windings in cases where it is desired to integrate a quantity varying as a function of both current and voltage or as some power of current alone instead of voltage.

For example, in the case of a lighting system including a plurality of similar lamps 14 and 15, some of which may be turned off and on independently of the others by switches 49, the total quantity of the light given depends both on the voltage of the circuit and the number of lamps connected, which latter condition determines the current drawn. In such a case, the quantity to be integrated varies as the product of the first power of current, and some power of voltage depending on the design of the lamps, e. g., the third power. In this case, the variable speed transmission 19 or the variable strength brake mechanism 22, whichever is used, is given the same adjustment as previously used in integrating the fourth power of voltage, and the switch blades 48 and 50 are moved to the downward position connecting the meter winding 26 in series with the secondary winding 51 of a current transformer and opening the curent transformer protective short-circuiting contacts. The torque of the motor unit 16 then varies as the product of current and voltage and an additional factor proportional to the voltage squared is introduced in the registration as previously described so that the registration is proportional to the integral of current times voltage cubed. Obviously, quantities varying as a different power of voltage may be integrated by giving the apparatus a different adjustment in the manner already explained.

If it is desired to integrate a quantity varying as the product of powers of both voltage and current, two variable speed ratio transmissions of the type shown at 19 may be interposed in tandem between the shaft 20 and the register, using a current winding to attract one plunger and a voltage winding to attract the other plunger, or both the variable speed ratio transmission 19 and the variable strength braking mechanism 22 may be used, making one of the windings 35 and 45 a current winding and the other a voltage winding. For example, a double-throw switch 52 may be provided which may be moved to the downward position to connect the winding 45 to the current transformer 51 to respond to the current in circuit 11 instead of the voltage therein.

The apparatus may also be employed for integrating either the reactive or the power component of a current. For this purpose, the induction disc motor 16 is connected as an ordinary wattmeter (or reactive volt-ampere meter) and the apparatus is adjusted as explained in connection with integrating negative powers of voltage so that the ratio of the speed of the register to the speed of the shaft 20 varies inversely as the voltage. For example, in integrating the power component of current with respect to time, the switch blades 48 and 50 are moved to the downward position to connect motor 16, as a watt-meter, and the register 17 and brake mechanism 22 may be used by so proportioning the pole pieces 43 and 44, the winding 45, and the yoke 40 that the flux produced varies directly as the square root of the voltage, and the braking effect varies directly as the voltage. In consequence, the effect of variations in voltage on the winding 25 of the watt-meter unit 16 is overcome and the register 17 integrates the power component of current instead of the scalar value of current or the vector sum of the power and reactive components as in the case of ordinary ampere-hour meters. This is in effect a special case of the previous examples in which the voltage factor has the exponent zero.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. An integrating electric meter comprising in combination, a rotatable member, means for exerting a torque thereon proportional to a function of voltage, a register geared to said rotatable member, a second register, a variable speed ratio transmission between said second register and said rotatable member, means for varying the speed ratio of said transmission in response to variations in voltage, a removable brake mechanism exerting a resisting torque on said rotatable member dependent only upon the speed of revolution, and a second removable braking mechanism exerting a resisting torque on said rotatable member dependent both upon speed of rotation and voltage.

2. An integrating electric meter comprising in combination, a rotatable member, means for driving it at a speed proportional to voltage squared, a register, a variable speed ratio transmission gearing between said rotatable member and said register, and means for varying the speed ratio of said transmission in response to variations in voltage, whereby said register records the time integral of a power of voltage other than the second power.

3. An integrating electric meter comprising in combination, a rotatable member, means for exerting a torque thereon proportional to voltage squared, a register geared to said rotatable member, a brake mechanism exerting a resisting torque on said rotatable member dependent upon its speed of rotation and upon voltage, said brake mechanism including means for causing the braking effect to vary substantially as a given power of voltage, whereby said rotatable member is driven at a speed proportional to a power of voltage differing by two from said previously mentioned power and said register records the time integral of the latter power of voltage.

4. A meter for integrating the product of two functions of a variable quantity comprising in combination, a rotatable member, means for driving it at a speed proportional to one function of the quantity, a register, a variable speed ratio transmission gearing between said rotatable member and said register, and means for varying the speed ratio of said transmission in proportion to another function of said quantity, whereby said register records the time integral of the product of the functions of the quantity.

5. A meter for integrating the product of two functions of a variable quantity comprising in combination, a rotatable member, means for exerting a torque thereon proportional to one function of the variable quantity, a register geared to said rotatable member, and a brake mechanism exerting a resisting torque on said rotatable member dependent on its speed of rotation and inversely proportional to another function of the variable quantity, whereby said rotatable member is driven at a speed proportional to the product of the two functions of the variable quantity and said register records the time integral of the product.

6. A meter for integrating the product of two functions of a variable quantity comprising in combination, a rotatable member, means for exerting a torque thereon proportional to one function of the variable quantity, a register, gearing connecting said register to said rotatable member, and means for varying the ratio between the speed of said register and the torque exerted on said rotatable member in proportion to another function of the variable quantity, whereby said register is driven at a speed proportional to the product of the variable quantities and records the time integral thereof.

7. Apparatus for measuring the reactive volt-ampere-hour input of a transformer from the secondary side comprising in combination with the transformer, a volts-to-fourth power hour electric meter comprising a motor unit with windings connected across the secondary side of said transformer to produce a torque proportional to the square of the secondary voltage of said transformer, a register, and means for varying the ratio of the speed of said register to torque exerted by said motor unit substantially as the square of said secondary voltage.

8. A light output integrator for an incandescent electric lamp comprising in combination with the lamp an electric meter connected in shunt with said lamp and arranged to integrate with respect to time the fourth power of voltage.

9. Apparatus for measuring the reactive volt-ampere-hour input of a transformer from the secondary side comprising in combination with the transformer, a volts-to-the-fourth-power hour electric meter connected across the secondary side of said transformer, and means for adjusting said meter to integrate a power of voltage differing from four for the purpose of causing the law of the meter to conform to the characteristics of the transformer.

10. A light output integrator for an incandescent electric lamp comprising in combination with the lamp, an electric meter connected in shunt therewith integrating a power of voltage between 2.5 and 5, and means for adjusting said meter to integrate a power of voltage corresponding to the relationship between candlepower and voltage of said lamp.

11. A light output integrator for an incandescent electric lamp comprising in combination with the lamp, an electric meter connected in shunt therewith arranged to integrate a power of voltage between 2.5 and 5.

12. A light output integrator for an incandescent electric lamp system comprising in combination therewith, a watt-hour meter connected in circuit therewith having a torque-producing unit with a rotatable member, a register, mechanism for causing the ratio of the speed of said register to the torque exerted on said rotatable member to vary as a power of voltage between 1.5 and 4, and means for adjusting said mechanism to make said ratio proportional to a power of voltage one less than the power of voltage representing the relationship between light output and voltage.

13. A light output integrator for an incandescent electric lamp system comprising in combination therewith, a watt-hour meter connected in circuit therewith having a torque-producing unit with a rotatable member, a register, and mechanism for causing the ratio of the speed of said register to the torque exerted on said rotatable member to vary as a power of voltage between 1.5 and 4.

14. In combination with a transformer having primary and secondary windings, an electric meter connected in shunt with said secondary winding and arranged to integrate a power of voltage between 2.5 and 5.

15. Apparatus for integrating with respect to time the power component of an alternating current comprising a watt-hour meter having voltage and current windings, and a torque-producing unit with a rotatable member, a register and mechanism for causing the ratio of the speed of said register to the torque exerted on said rotatable member to vary inversely with voltage, whereby the speed of said register is independent of the voltage acting on said voltage winding.

16. Apparatus for integrating with respect to time the reactive component of an alternating current comprising a reactive volt-ampere hour meter having voltage and current windings, and a torque-producing unit with a rotatable member, a register and mechanism for causing the ratio of the speed of said register to the torque exerted on said rotatable member to vary inversely with voltage, whereby the speed of said register is independent of the voltage acting on said voltage winding.

17. A meter for integrating with respect to time a function of current and voltage in an electrical circuit comprising in combination, a torque-producing unit having a rotatable member and a pair of current-conducting windings, a register and mechanism including a current-conducting winding for varying the ratio of the speed of said register to the torque exerted on said rotatable member in accordance with a function of the current in said last mentioned current-conducting winding, at least one of said current-conducting windings being connected in series with the electrical circuit to be measured, and at least one of said current-conducting windings being connected across the circuit to serve as a potential winding.

18. In combination, an induction-motor unit having a rotatable member and a pair of stationary current-conducting windings producing a torque which is a function of the respective currents in said windings, a register geared to said rotatable member, and mechanism including a current-conducting controlling winding for varying the ratio of the speed of said register to the torque exerted on said rotatable member in proportion to a function of the current in said control winding.

19. In combination, an induction motor unit having a rotatable member and at least one stationary current-conducting winding producing a torque which is a function of the current in said winding, a register geared to said rotatable member, mechanism including a current-conducting controlling winding for varying the ratio of the speed of said register to the torque exerted on said rotatable member in proportion to a function of the current in said control winding, and means for adjusting said mechanism to vary the functional relationship between said ratio and the current in said control winding.

20. In an electric meter, the combination of a damping disc and a permanently-magnetized horse-shoe magnet mounted with its polar extremities on opposite sides of said disc and having at least one U-shaped pole piece composed of permeable magnetic material with a connecting portion adjacent one of the polar extremities of said horseshoe magnet and a pair of portions extending toward the other polar extremity of said horseshoe magnet leaving a pair of air gaps therebetween, said damping disc extending into only one of said air gaps, and a current-conducting winding carried on said extending portions to form a variable strength brake mechanism.

WILLIAM H. PRATT.